US006801386B1

(12) United States Patent
Niroot et al.

(10) Patent No.: US 6,801,386 B1
(45) Date of Patent: Oct. 5, 2004

(54) DAMPER DESIGN ON PIVOT BEARING SHAFT BY VIBRATION REDUCTION

(75) Inventors: Jierapipatanakul Niroot, Singapore (SG); Andre Yew Loon Liem, Singapore (SG); Mo Xu, Singapore (SG); Joseph Heng Tung Lau, Singapore (SG); Michael Joo Chiang Toh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/556,886

(22) Filed: Apr. 19, 2000

Related U.S. Application Data
(60) Provisional application No. 60/130,305, filed on Apr. 21, 1999.

(51) Int. Cl.$^7$ ................................. G11B 33/14
(52) U.S. Cl. ................. 360/97.01; 360/99.08; 360/265.6
(58) Field of Search ............... 360/97.01, 98.01, 360/99.01, 264.1, 99.08, 97.02, 97.03, 98.07

(56) References Cited

U.S. PATENT DOCUMENTS

| | | | |
|---|---|---|---|
| 4,945,435 A | 7/1990 | Boigenzahn et al. | 360/265.2 |
| 5,376,850 A | 12/1994 | Elsing et al. | 310/67 R |
| 5,430,589 A | 7/1995 | Moir et al. | 360/97.02 |
| 5,483,397 A * | 1/1996 | Gifford et al. | 360/97.01 |
| 5,517,375 A | 5/1996 | Dion et al. | 360/98.07 |
| 5,587,855 A | 12/1996 | Kim | 360/97.02 |
| 5,825,585 A | 10/1998 | Hatam-Tabrizi | 360/97.02 |
| 5,914,837 A | 6/1999 | Edwards et al. | 360/265.6 |
| 5,930,071 A | 7/1999 | Back | 360/97.01 |
| 6,075,672 A * | 6/2000 | Morris et al. | 360/97.01 |
| 6,177,173 B1 * | 1/2001 | Nelson | 428/137 |
| 6,256,165 B1 * | 7/2001 | Kim | 360/97.01 |

FOREIGN PATENT DOCUMENTS

| | | | |
|---|---|---|---|
| GB | 2267326 | * | 1/1993 |
| JP | 1-165069 | * | 6/1989 |
| JP | 2001-43658 | * | 2/2001 |

OTHER PUBLICATIONS

IBM Technical Disclosure Bulletin; vol. 32, Issue 12, p. 30; May 1990; "Hard Disk drive".*

* cited by examiner

Primary Examiner—Jefferson Evans
(74) Attorney, Agent, or Firm—Derek J. Berger

(57) ABSTRACT

A pivot cartridge assembly with improved resonance characteristics. One end of the pivot bearing shaft is mounted to the base of the disc drive, and the other end is secured to the cover of the disc drive in such a manner that the resonance characteristics of the pivot bearing assembly is improved in both the axial and radial direction of the pivot bearing shaft.

14 Claims, 4 Drawing Sheets

DAMPER DESIGN ON PIVOT BEARING SHAFT BY VIBRATION REDUCTION

This patent application claims priority from U.S. Provisional Application No. 60/130,305, filed Apr. 21, 1999.

FIELD OF INVENTION

The present invention relates generally to disc drives, and more particularly to a pivot cartridge assembly with vibration reduction features for use in a disc drive.

BACKGROUND OF THE INVENTION

A disc drive typically has one or more data storage discs mounted on a spindle motor for rotation. Data is read from or written to a plurality of concentric tracks on the discs by an array of read/write heads. These heads are supported by actuator arms controllable by an actuator assembly such that the heads can be positioned at the desired track for each read/write activity.

All disc drives experience some vibration from the various moving parts or vibrations induced by electronic switching. At the same time, in response to the demand for more data storage capacities and shorter seek response time, the discs are configured with increasingly higher track densities and the actuator arms are made relatively light to minimize seek response time. Under such conditions, the effect of vibration is magnified and precise motion control of the actuator arms becomes difficult, especially in the face of increasingly high expectations of shorter seek response time and accuracy in head positioning.

The mechanism that supports the rotational motion of the head positioning actuator is the pivot cartridge assembly which is a major component in the disc drive. The performance of the pivot cartridge assembly is therefore critical to the overall performance of the disc drive, affecting among other things, seek response time and resonance in the actuator assembly.

One conventional method of improving the performance of the pivot cartridge assembly is by securing the upper end of the pivot bearing shaft to the cover of the housing. However, this tends to increase the acoustics level of the disc drive as the cover will serve as a vibrative diaphragm.

The U.S. Pat. No. 5,825,585 issued Oct. 20, 1998, to Tabrizi for "Laterally Constrained and Damped Mount for a Hard Disk Drive" describes a shaft which is secured to the cover of the housing by a resilient shaft mount. Whilst this may improve the natural frequency mode in the axial direction of the shaft, it nevertheless fails to address the resonance problems in the radial direction.

Another approach to vibration control is disclosed in the U.S. Pat. No. 5,930,071 issued Jul. 27, 1999, to Back for "Disk Drive Assembly with Vibration Dampening Pivot Assembly". This document describes the bonding of a rubber-like material to surfaces which are part of a "bond joint", a "bond joint" referring to either the joint between the pivot shaft and the inner race of the pivot bearing or the joint between the outer race of the pivot bearing and the pivot housing.

It is a challenge to implement damping techniques that do not involve additional housing members, couplings and rubber interfaces. More often than not, these components require elaborate manufacturing processes or additional sub-assemblies which will decrease the production yield.

There is therefore a need for improved vibration control in a disc drive. It will be evident from the following description that the present invention offers this and other advantages over the prior art.

SUMMARY OF THE INVENTION

The present invention provides for the coupling of an upper end of the pivot bearing shaft to the cover of the disc drive in such a manner that the resonance characteristics of the pivot bearing assembly is improved in both the axial and radial direction of the pivot bearing shaft. A damper is located between the pivot bearing shaft and the cover such that the pivot bearing shaft and the cover do not come into direct contact. In addition, the assembly is configured and arranged for the cover to exert restraining forces on the pivot bearing shaft in the radial direction, indirectly through the damper. The damper comprises a sleeve for abutment against the rim of a hole in the cover and against the side of the pivot bearing shaft. The damper may further include a recess for receiving the pivot bearing shaft. The damper may also have a hole in a wall of the recess for receiving a fastener.

In another aspect, the present invention provides for a method of dampening vibration in a disc drive by fitting a damper between an upper end of the pivot bearing shaft and the cover such that the damper is in direct contact with the pivot bearing shaft and with the rim of an opening in the cover of the disc drive.

DETAILED DESCRIPTION

Figure 1:
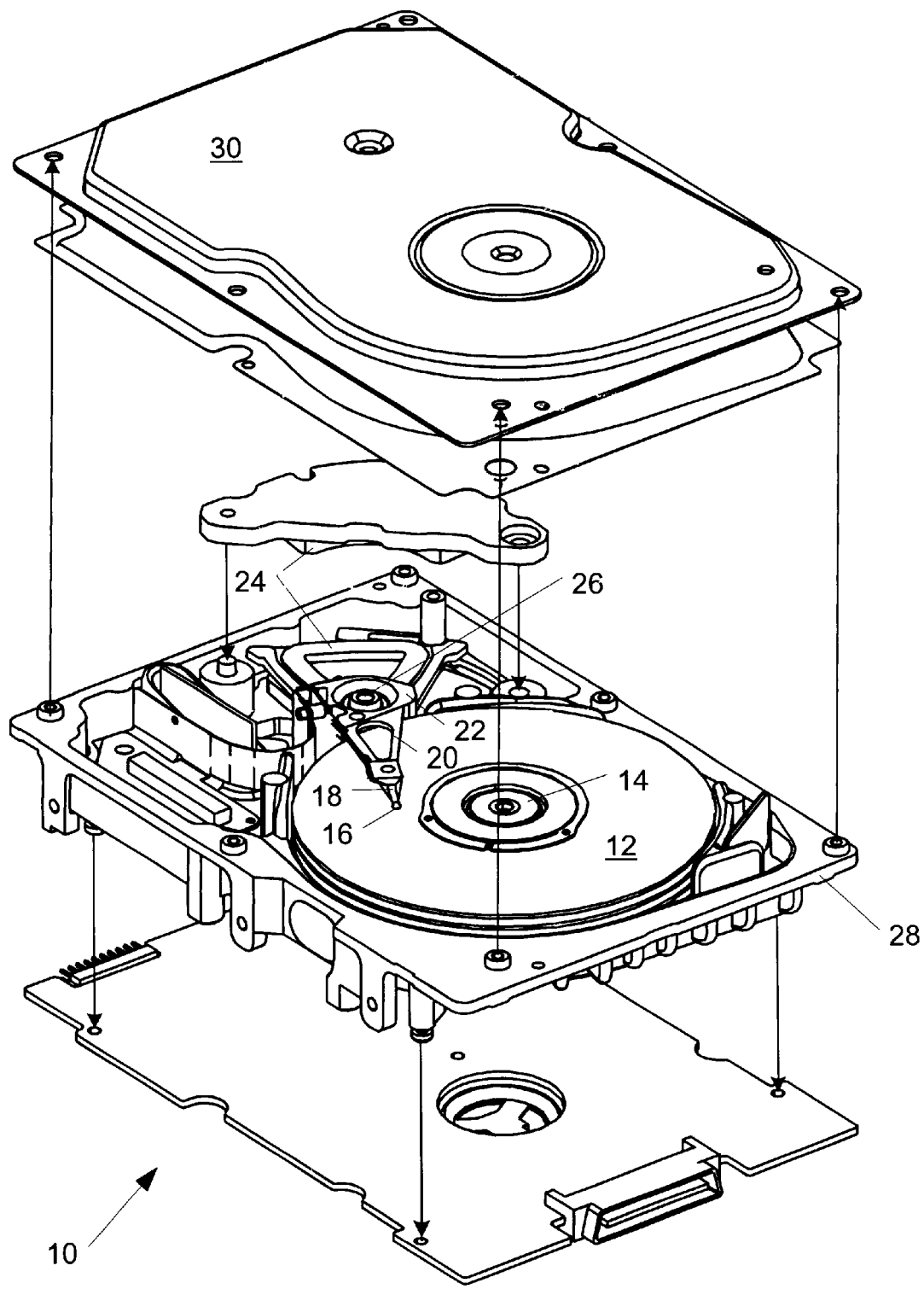
FIG. 1 shows an exemplary disc drive in which the present invention may be implemented.

Preferred embodiments of the invention are described below with reference to the drawings. FIG. 1 shows an exemplary disc drive 10 in which the present invention may be implemented. One or more discs 12 are rotatably mounted to a spindle motor 14. Data is written to or read from the discs by heads 16 which are supported by suspensions 18 which are in turn attached to actuator arms 20 of an actuator body 22. The actuator shown is of the type known as a rotary actuator and includes a voice coil motor 24 for imparting the forces for rotating the actuator body. The actuator body is operably connected to a pivot cartridge assembly 26 which allows for rotational motion. In this manner, the heads can be controllably moved to the desired track locations. A base 28 and a cover 30 provide an enclosure for housing these and other components, protecting them from outside environmental influences. The base also provides a platform for mounting the various components.

Figure 2:
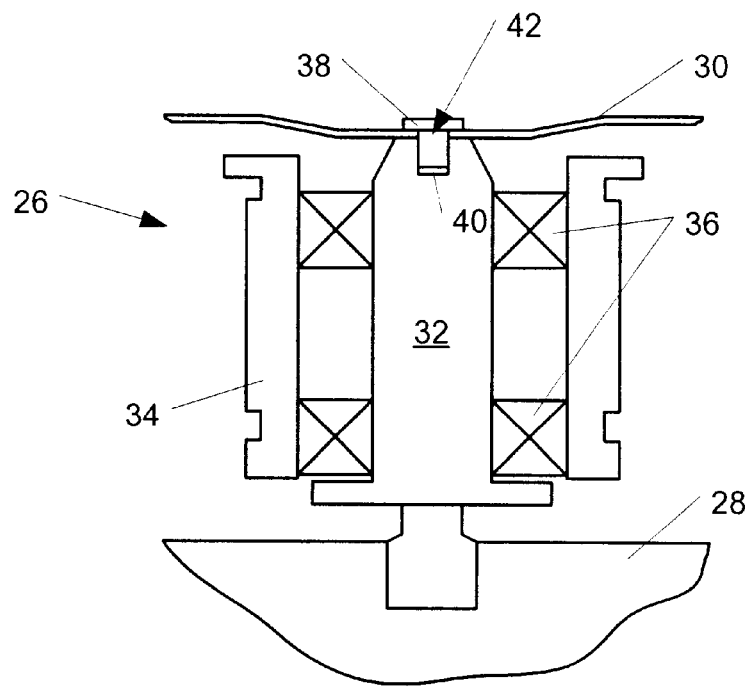
FIG. 2 is a cross-section of a typical pivot cartridge assembly.

As illustrated in FIG. 2, the pivot cartridge assembly 26 in the disc drive 10 typically comprises three main components: a pivot bearing shaft 32, a pivot bearing housing 34 and bearings 36. The pivot bearing shaft is mounted to the base of the disc drive at its lower end. The inner races of the bearings are located along the length of the pivot bearing shaft. The outer races of the bearings are attached to the pivot bearing housing. Attached to the pivot bearing housing is the actuator body 22 which extends into an array of actuator arms 20, and terminating in an array of read/write heads 16.

In one conventional arrangement, the upper end of the pivot bearing shaft 32 is secured to the cover 30 of the disc drive 10 by a screw 38. The upper end of the pivot bearing shaft is provided with a threaded hole 40 corresponding to the screw. The cover has a hole 42 which is located above the threaded hole such that, in assembly, the screw clamps the cover against the top surface of the pivot bearing shaft. Part of the cover is therefore in direct contact with the pivot bearing shaft, and is sandwiched between the screw and the pivot bearing shaft. The cover therefore acts as a vibrative diaphragm, amplifying any vibration transmitted through the pivot bearing shaft instead of dampening it.

Figure 3:
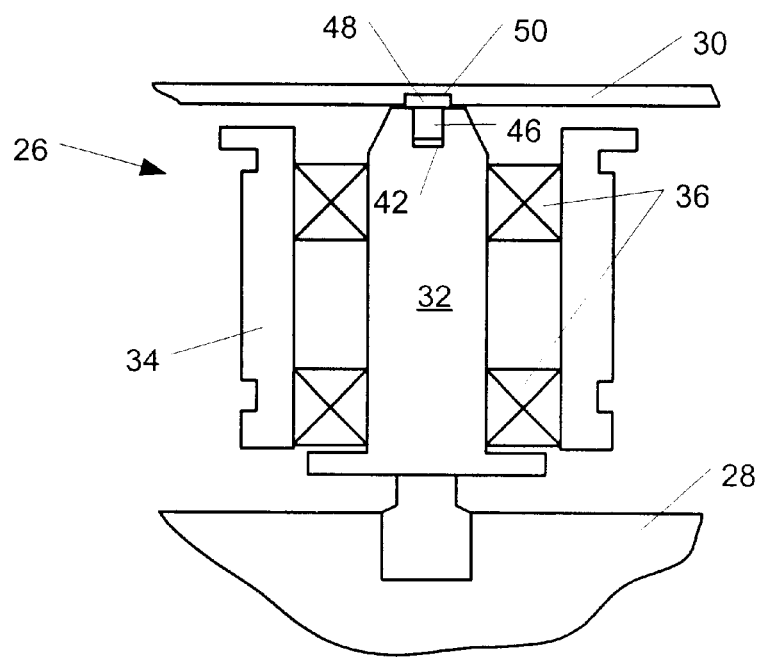
FIG. 3 is a cross-section of another conventional pivot cartridge assembly with a damper.

FIG. 3 shows another conventional arrangement where one end 46 of a piece of elastomeric material is inserted into the hole 42 in the upper end of the pivot bearing shaft 32 and another end 48 is inserted into a recess 50 in the cover. Although this arrangement may help to isolate vibrations to the cover, it does not provide sufficient stiffness to limit bending of the upper end of the pivot bearing shaft 32. The performance of the disc drive 10 continues to be adversely affected since the vibrations of the voice coil motor 24 are not prevented from transmitting to the read/write heads 16 through the actuator arms 20.

Figure 4:
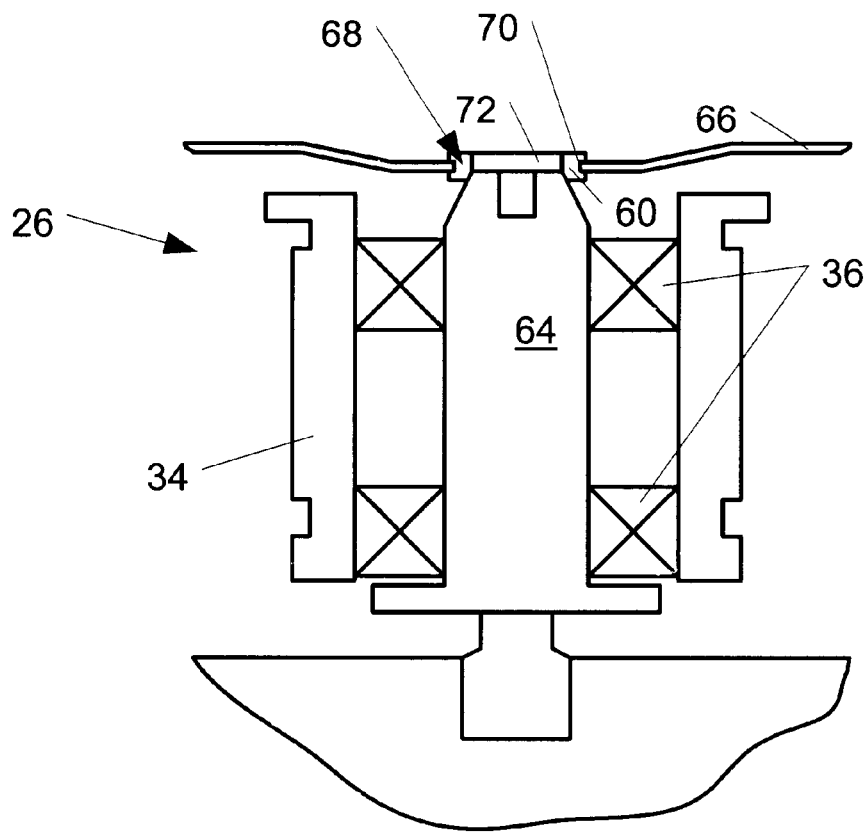
FIG. 4 is a cross-section of a pivot cartridge assembly according to a most preferred embodiment of the present invention.

According to a most preferred embodiment of the present invention as shown in FIG. 4, a damper 60 comprises a sleeve 62 for fitting around the circumference of the pivot bearing shaft 64 at its upper end. The cover 66 of the disc drive 10 is provided with an opening 68 (defined by a rim 70) sized for interference fit with the sleeve 62 when the sleeve is fitted over the pivot bearing shaft. As shown in FIG. 4, the sleeve may be located around an extension 72 of the pivot bearing shaft if not directly on the pivot bearing shaft itself. The arrangement is characterized by the cover 66 having no direct contact with the pivot bearing shaft 64. The desired stiffening of the pivot bearing shaft is thus achieved without making the cover a vibrative diaphragm. In addition, the boundary conditions at the upper end of the pivot bearing shaft facilitates the damping of bending vibrations as well as axial vibrations in the pivot bearing shaft, being that the forces exerted by the cover on the pivot bearing shaft are in the radial directions and not only in the axial direction of the pivot bearing shaft. Another advantage of the present invention is that there is no need for additional fasteners, subassemblies, adhesives or special bonding of the damper to existing disc drive components.

Figure 5:
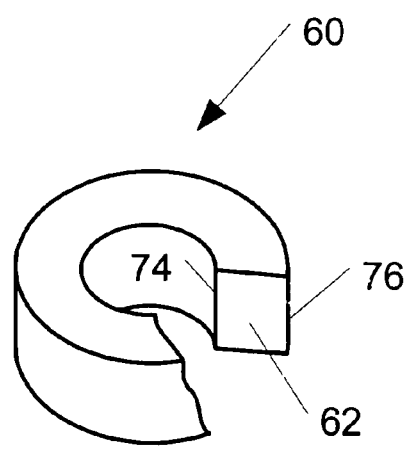
FIG. 5 shows the damper of FIG. 4 with a portion cut away to show the profile.

FIG. 5 illustrates a preferred configuration for the damper 60. The damper has a simple profile as shown by the cut-away portion, and is relatively easy to manufacture as compared to other known damping mechanisms for disc drives. It comprises a sleeve 62 with a inner surface 74 for contact with a side surface of the pivot bearing shaft and an outer surface 76 for contact with the rim 70 of the opening 68 in the cover 66.

The cover 66 may also be described as being formed with a hole 68 through which the pivot bearing shaft 64 is configured to extend. The damper 60 is located between the cover 66 and the pivot bearing shaft 64. In particular, the damper comes into contact with the cover at the rim 70 of the hole 68 and with the pivot bearing shaft 64 along the length of the pivot bearing shaft.

Figure 6:
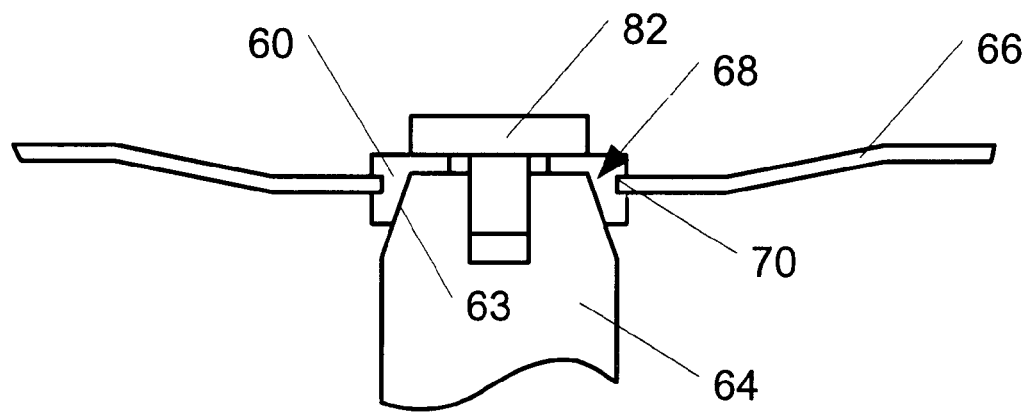
FIG. 6 shows an alternative embodiment of the present invention.
Figure 7:
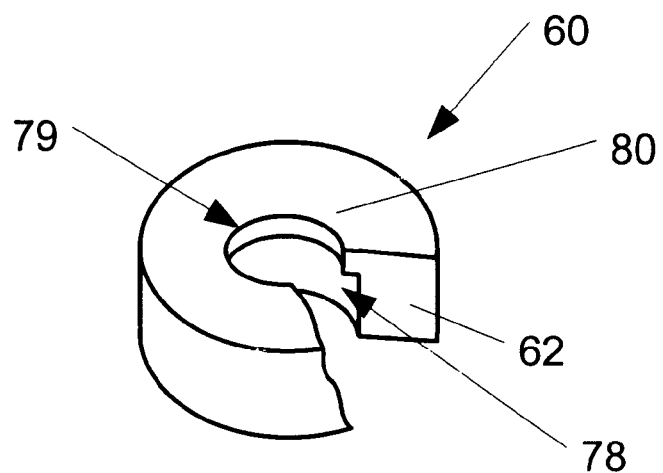
FIG. 7 shows a damper of FIG. 6.

In another embodiment of the present invention, the damper 60 includes a recess 78 formed in part by the sleeve 62 such that the recess is configured for receiving the upper end of the pivot bearing shaft as shown in FIG. 6. One possible configuration of the damper 60 is illustrated in FIG. 7 where it shows the sleeve 62 for abutment against the rim 70 of the hole 68 in the cover 66 and against the side 63 of the pivot bearing shaft 64. The recess is for receiving the pivot bearing shaft whilst a fastener hole 79 in an end wall 80 of the damper provides a hold for a fastener 82.

Alternatively, the fastener 82 may be omitted as the damper 60 may be fixed in position by being in interference fit with the pivot bearing shaft 64 or the cover 66. This allows for simple assembly as well as ensuring sufficient compression of the damper to provide the desired boundary conditions.

The damper 60 is preferably made of a resilient material such as Kokoku HG 46 or a material with a similar durometer. However, according to the needs of different disc drive systems, materials of a different durometer may be chosen.

In the experiments conducted, it was found that the present invention significantly improves the resonance characteristics of the disc drive. 795 Hertz was identified as the first bending mode of the voice coil 24 which forms part of the actuator 23. When the voice coil resonates at this natural frequency, energy is transmitted through the pivot cartridge assembly 26, along the actuator arms 20, to the heads 16, thereby adversely affecting disc drive performance. Another significant frequency was found at 1.45 kilohertz, being the first torsion mode of the voice coil. It was found that an improvement in both the 795 Hertz and the 1.45 kilohertz ranges were possible with the implementation of the present invention. The damper 60 in this configuration and arrangement was therefore found to be effective in isolating the read/write heads from the resonance frequency originating from the voice coil, and especially in damping the magnitude of the resonance frequency transmitted to the read/write heads. As a result, improved servo performance during seek can be achieved.

It was thus found that the present invention provides the desired improvements in the damping characteristics of the pivot cartridge assembly. In addition, it provides for improved robustness and rigidity in the pivot bearing shaft. Other advantages offered are that the overall acoustics emission from the disc drive is reduced, and that the implementation of the present invention is relatively inexpensive.

Embodiments of the present invention may alternatively be described as follows:

A disc drive 10 includes an enclosure that is formed by a base 28 and a cover 66. An opening 68, defined by a rim 70, is provided in the cover. The lower end of a shaft 64 is mounted to the base 28. A damper 60 is positioned such that it is in abutment with the rim 70 and with the upper end of the shaft 64. In particular, the damper 60 may be in contact with the side surface 63 at the upper end of the shaft 64. Preferably, the damper 60 is sized for interference fit with the shaft 64. The damper 60 may also be sized for interference fit with the rim 70.

The foregoing description is only illustrative of various embodiments of the invention, and a person skilled in the art will understand that changes can be made to the details of structure, function and processes without going beyond the scope of the present invention.

What is claimed is:

1. A disc drive comprising:
   a base;
   a cover configured for assembly with the base to form an enclosure;
   a rim defining an opening extending through the cover;
   a shaft with a lower end and an upper end, the lower end being mounted to the base; and
   a resilient damper in abutment with the rim and with the upper end of the shaft.

2. A disc drive of claim 1 wherein the shaft has a side surface extending along its length, and wherein the damper is in abutment with the side surface at the upper end of the shaft.

3. A disc drive of claim 1 wherein the damper is sized for interference fit with the shaft.

4. A disc drive of claim 1 wherein the damper is sized for interference fit with the rim.

5. The disc drive of claim 1, in which the damper comprises a sleeve.

6. The disc drive of claim 1, in which the upper end of the shaft is located within the opening.

7. The disc drive of claim 1, in which the cover is positioned above the base and in which the damper extends above an uppermost portion of the rim.

8. The disc drive of claim 1, further comprising:
   a screw for securing the damper to the shaft.

9. A method for dampening vibration in a disc drive comprising steps of:
   (a) providing a base and a complementing cover for enclosing components of the disc drive, the cover having an opening defined by a rim;
   (b) providing a pivot bearing assembly comprising a pivot bearing shaft;
   (c) mounting a lower end of the pivot bearing shaft to the base; and
   (d) fitting a damper between an upper end of the pivot bearing shaft and the cover such that the damper is in abutment with a side surface of the pivot bearing shaft and with the rim of the opening.

10. A method of claim 9 wherein the fitting step (d) includes steps of:
    (e) providing an interference fit between the damper and the rim; and
    (f) providing an interference fit between the damper and the side surface of the pivot bearing shaft.

11. A disc drive comprising:
    a base;
    a pivot bearing assembly mounted to the base;
    a head positioning actuator operably coupled to the pivot bearing assembly; and
    means for damping vibration transmitted to the head positioning actuator through the pivot bearing assembly.

12. The disc drive of claim 11, in which the damping means comprises a sleeve.

13. The disc drive of claim 11, further including a cover configured to cooperate with the base so as to define an enclosed space, in which the damping means is configure to be interference fit within an opening in the cover.

14. The disc drive of claim 11, in which the damping means is configured to be interference fit with the shaft.

* * * * *